United States Patent
Pitruzzello et al.

(10) Patent No.: US 6,704,460 B1
(45) Date of Patent: Mar. 9, 2004

(54) REMOTE MOSAIC IMAGING SYSTEM HAVING HIGH-RESOLUTION, WIDE FIELD-OF-VIEW AND LOW BANDWIDTH

(75) Inventors: Michael C. Pitruzzello, Huntsville, AL (US); Marc W. Crooks, Huntsville, AL (US); Troy L. Hester, Madison, AL (US)

(73) Assignee: The United States of America as represented by the Secretary of the Army, Washington, DC (US)

(*) Notice: Subject to any disclaimer, the term of this patent is extended or adjusted under 35 U.S.C. 154(b) by 606 days.

(21) Appl. No.: 09/613,521

(22) Filed: Jul. 10, 2000

(51) Int. Cl.[7] .............................. G06K 9/36; G06K 9/32; H04N 13/02; G03B 37/04
(52) U.S. Cl. .................... 382/284; 382/294; 348/48; 352/70
(58) Field of Search ................... 382/154, 268, 382/284, 294, 302, 303, 304, 305; 348/36, 42, 47, 48, 580, 614; 352/69, 70

(56) References Cited

U.S. PATENT DOCUMENTS

| | | | | |
|---|---|---|---|---|
| 4,463,380 A | * | 7/1984 | Hooks, Jr. ................... | 348/580 |
| 5,649,032 A | * | 7/1997 | Burt et al. ................... | 382/284 |
| 5,963,664 A | * | 10/1999 | Kumar et al. ................ | 382/154 |
| 6,389,179 B1 | * | 5/2002 | Katayama et al. ........... | 382/284 |
| 6,522,787 B1 | * | 2/2003 | Kumar et al. ................ | 382/268 |

* cited by examiner

*Primary Examiner*—Mehrdad Dastouri
(74) *Attorney, Agent, or Firm*—Arthur H. Tiacher; Hay Kyung Chang

(57) ABSTRACT

The Remote Mosaic Imaging System having High-Resolution, Wide Field-of-View and Low Bandwidth ("Remote Mosaic System") uses image frame synchronization and multiplexing to reduce the bandwidth needed to transmit the plurality of images to a remote location. The Remote Mosaic System employs a plurality of remote sensors to create a plurality of images. The use of readily available and inexpensive commercial imaging sensors significantly decreases the cost of the system while greatly increasing the capabilities of the imaging system to cover virtually any target space with virtually any desired resolution.

2 Claims, 4 Drawing Sheets

REMOTE MOSAIC IMAGING SYSTEM HAVING HIGH-RESOLUTION, WIDE FIELD-OF-VIEW AND LOW BANDWIDTH

DEDICATORY CLAUSE

The invention described herein may be manufactured, used and licensed by or for the Government for governmental purposes without the payment to us of any royalties thereon.

BACKGROUND OF THE INVENTION

Remote imaging systems are in use in many applications ranging from convenience store monitoring cameras to sophisticated imaging systems on satellites in space. Such systems typically consist of an imaging sensor comprised of light-gathering optics, a detector array and support electronics that produces an electronic video signal that is transmitted to a remote site for human operator viewing and recording. The imaging sensor is often rotated about one or more axes (usually using a set of gimbals) or translated in space to view an area that is larger than that covered by the sensor's optical field of view. In many systems the gimbals are controlled by gyroscopes to isolate the base motion of the sensor platform from the image, thus providing a stable image for the operator. Often, the sensor optical system contains a zoom lens or switchable elements that allow the field of view to be changed for greater resolution or for a larger field of view coverage. By these means the operator is able to view different portions of the observable space (commonly called the "target space" or "target area") at the resolutions needed to detect and recognize items of interest. In most applications, the images received from the remote sensor are recorded on videotape for later viewing and/or processing by observers at different remote sites.

Existing remote imaging systems lack the capability to produce much higher resolution and larger field of view combinations without the use of expensive and heavy switchable optical elements and gimbals. Such a combination of concurrent high resolution and large field of view is desired without significant increases in transmission system bandwidth or in degradation of image stability. Further, there is a need to be able to record the images in such a manner that any portion of the imaged target space is viewable almost instantly and can be sent to observers at remote sites. Lastly, all of these needs should be met at a cost that is affordable and scalable, as the application requires.

SUMMARY OF THE INVENTION

The Remote Mosaic Imaging System having High-Resolution, Wide Field-of-View and Low-Bandwidth, hereinafter referred to as the "Remote Mosaic System," utilizes a plurality of remote sensors to create a plurality of images. Readily available and inexpensive commercial imaging sensors, such as the sensors commonly used in hand-held camera recorders ("camcorders") can be used to create input images without zoom lenses, field of view-changing mechanisms or gimbals. The use of such sensors significantly decreases the cost of the system while greatly increasing the capabilities of the imaging system to cover virtually any target space with virtually any desired resolution.

Furthermore, as described in detail below, the "Remote Mosaic System" uses image frame synchronization and multiplexing to reduce the bandwidth needed to transmit the plurality of images to a remote location. Because the sensors can be physically mounted on the same platform, the image relationships from one sensor to an adjacent sensor are accurately fixed, thereby easing the subsequent mosaic-processing burden.

DESCRIPTION OF THE PREFERRED EMBODIMENT

Figure 1:
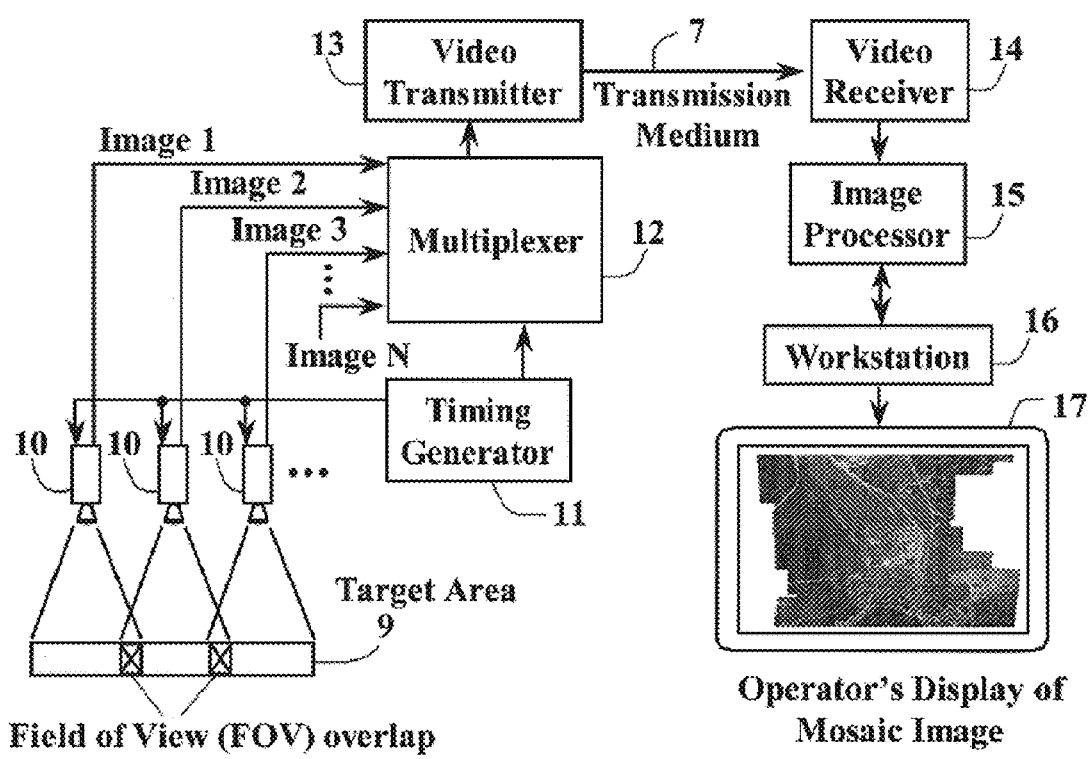
FIG. 1 is a diagram of a preferred embodiment of the "Remote Mosaic System."

Referring now to the drawing wherein like numbers represent like parts in each of the several figures and arrows indicate the direction of signal travel, the following describes in detail the structure and operation of the Remote Mosaic System.

The Remote Mosaic System uses to advantage well-known image mosaicing technologies such as that taught by Peter J. Burt et al in U. S. Pat. No. 5,649,032. Mosaicing is the process of taking a plurality of images that partially overlap and combining or "stitching" them together at the overlap points to form a larger composite, seamless image mosaic.

To date, sensor systems performing mosaicing have used a single imaging sensor to generate the necessary plurality of images that are then combined into the mosaic image. Although this can indeed result in coverage of the target area with good resolution, total coverage can be time consuming because of the number of sensor passes required to cover the target area completely, each pass collecting one "image strip." Further, if the imaging sensor is mounted on a moving platform such as an airplane, it may be difficult to aim the sensor with the precision required to ensure that the image strips overlap sufficiently for accurate mosaicing. Even though the Remote Mosaic System uses multiple imaging sensors, in some cases it may still be necessary to make multiple passes in order to cover the entire target space due to a large target area or any existing viewing obstructions or low visibility. However, each pass can result in a much wider image strip, thus requiring fewer passes. In addition, with larger image strips, less precision is required to aim the sensor system to ensure strip overlap.

FIG. 1 is a block diagram of a preferred embodiment of the Remote Mosaic System. A pre-selected number, N, of electro-optical imaging sensors 10, which may be inexpensive commercial imaging sensors, are mounted on a remote sensing platform (not shown in the figure) such that their fields of view of target area 9 overlap by an amount (typically small and shown in the figure as X's in target area 9) that is amenable to the mosaicing process. N may be as small as one or as large as needed to fulfill the requirements of the system. The outputs (video frames of the target area) obtained by the sensors are fed simultaneously into multiplexer 12 which, however, allows only one of the sensor outputs to pass through it at a time. The multiplexer also tags each video frame with the sensor number (typically into the vertical blanking area) to indicate which sensor generated which image. This tagging enables the images to be placed correctly in the subsequently resulting mosaic. Timing generator 11, coupled between each of the imaging sensors and the multiplexer, synchronizes any necessary scanning activities of the N sensors as well as causing multiplexer 12 to progress to the output of the next sensor during the vertical retrace period of the sensors. This ensures that minimum time is lost waiting for the next sensor's start-of-frame. Imaging sensors 10, timing generator 11 and multiplexer 12 are typically located remotely.

Figure 2:
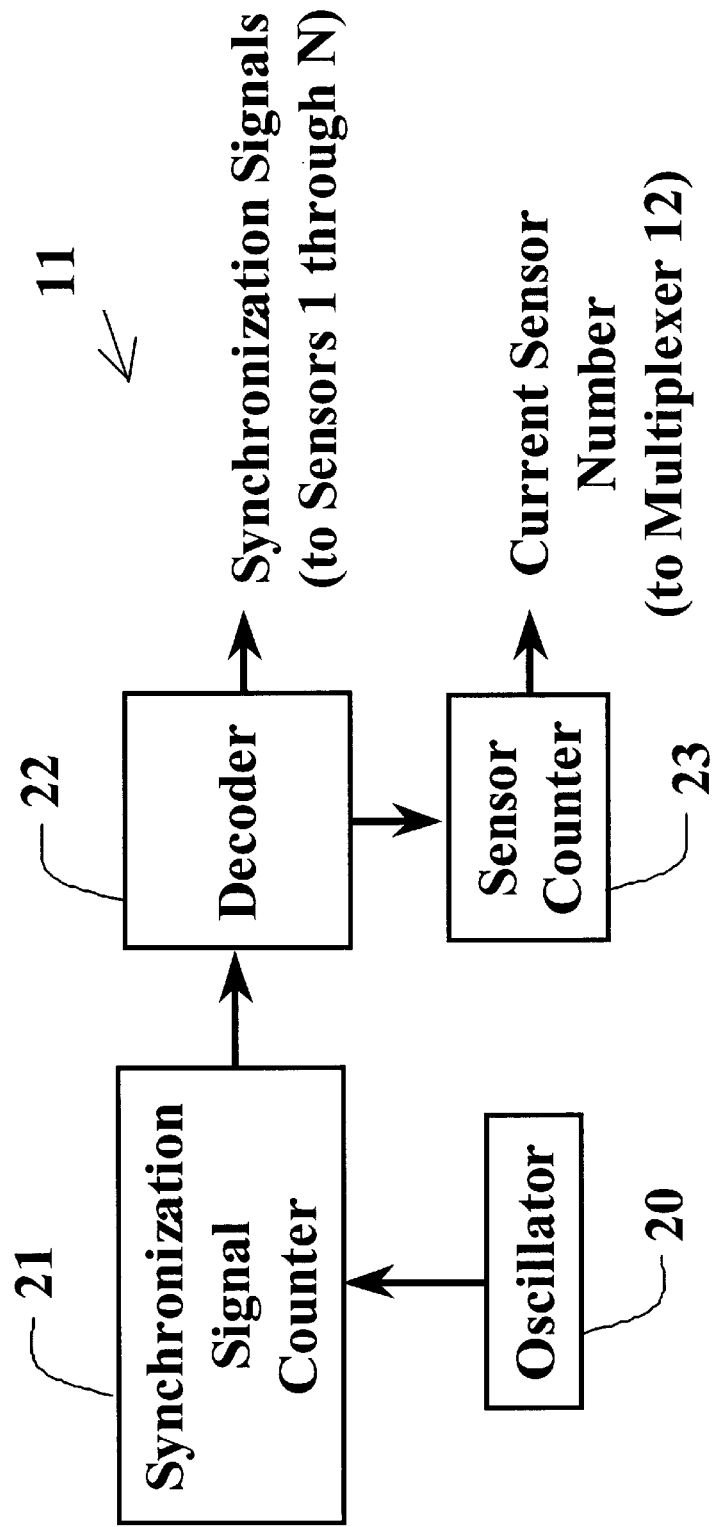
FIG. 2 presents a block diagram of the timing generator.

As illustrated in FIG. 2, timing generator 11 is comprised of oscillator 20, synchronization signal counter 21, decoder 22 and sensor counter 23. In operation, oscillator 20, which may be a typical stable oscillator made of a quartz crystal, outputs a precise series of pulses at a normal video field rate which defines the start of each image segment by an imaging sensor. These pulses are input to synchronization signal counter 21 which, in response to the pulses, outputs parallel digital word that represents a particular image segment from a particular sensor among imaging sensors 10. The synchronization signal counter resets itself when oscillator 20 has output enough pulses to account for a complete round of image production from all imaging sensors 10 and restarts the counting process for the next complete round of production of input images from the sensors. Decoder 22 receives the parallel digital word from the synchronization signal counter and produces timing signals that are input to imaging sensors 10 to synchronize the production of input images from the sensors. The decoder also produces end-of-frame pulses that are input to sensor counter 23. The sensor counter is a synchronous digital counter with reset capability that counts the end-of-frame pulses being input from decoder 22 and, when it has received N pulses, resets itself and restarts the counting process. The current sensor number, produced by the sensor counter in response to input from the decoder, represents the i th sensor and is input to multiplexer 12 to cause the multiplexer to transmit therethrough the image from the i th sensor to video transmitter 13.

Figure 3:
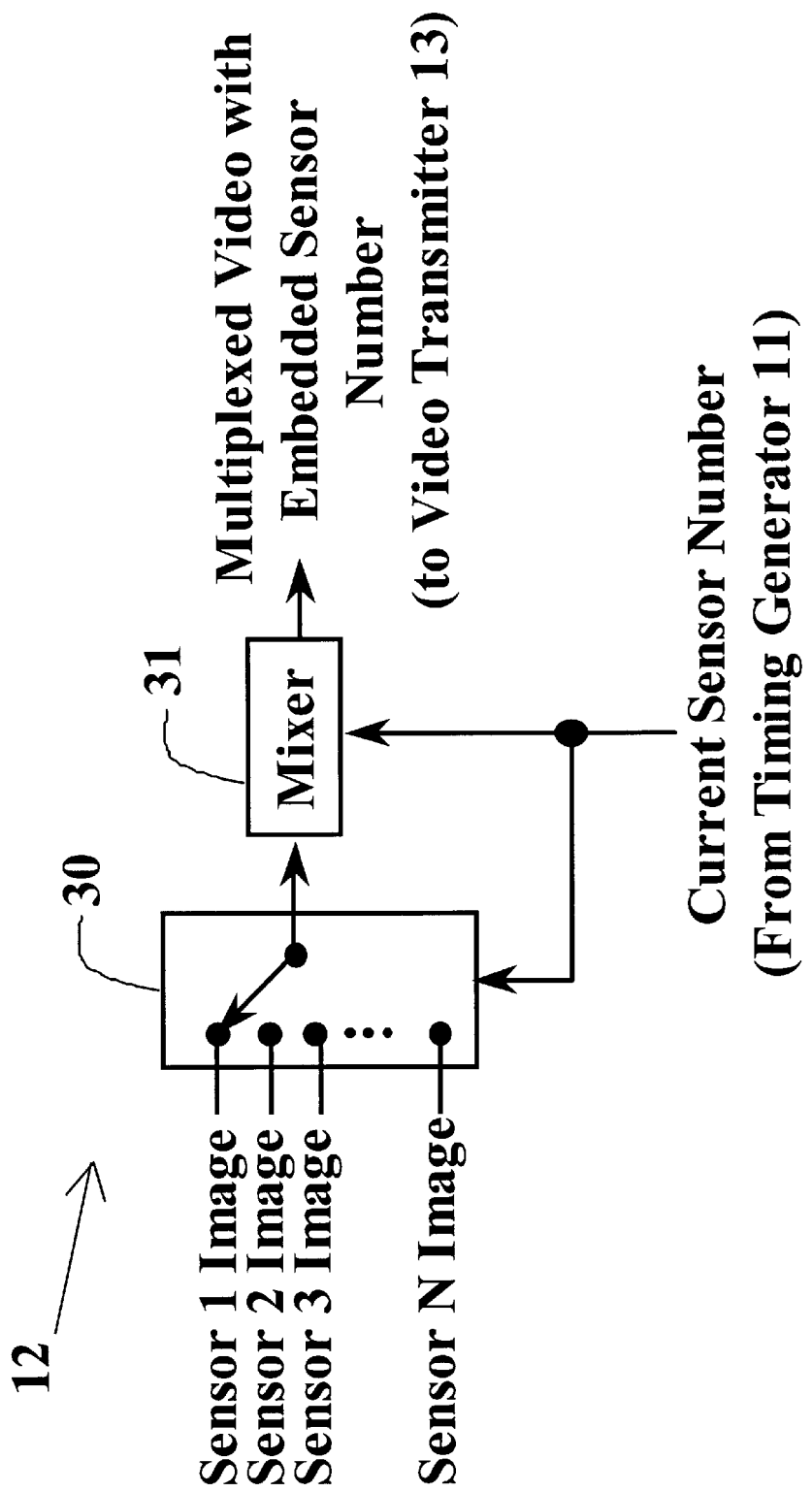
FIG. 3 illustrates the function of multiplexer 12 in detail.

FIG. 3 illustrates the function of multiplexer 12 in detail. As shown in FIG. 1, the outputs of the N imaging sensors 10 form the image inputs to Multiplexer 12, which is composed of electronic switch 30 and mixer 31. Electronic switch 30 and mixer 31 may be analog devices or digital devices depending on whether the sensor image inputs are analog or digital. Electronic switch 30 and mixer 31 also accept the current sensor number from timing generator 11. Electronic switch 30 uses the current sensor number to control the position of the switch, thus selecting only one image input to feed into the mixer 31 at any instant of time. The mixer uses the current sensor number to embed a particular signal into the image, thereby tagging the image, prior to transmitting the image to video transmitter 13. This particular signal can be decoded by image processor 15 to aid the mosaicing process. Because the image from only one imaging sensor is output from multiplexer 12 at any given instant, the system bandwidth is equivalent to that of one of the N imaging sensors 10.

The tagged output of multiplexer 12 feeds the video transmission system which is typically comprised of conventional video transmitter 13 and video receiver 14 with a suitable transmission medium 7 between the transmitter and receiver. Depending on the application of the Remote Mosaic System, transmission medium 7 could be as simple as air for wireless transmission, a wire connecting multiplexer 12 and image processor 15 or as complex as a satellite orbiting in space. In case of wireless transmission, video transmitter 13 and video receiver 14 can be conventional wireless units such as DSX 2427NA video transmitter and DSR-15249-24 video receiver, respectively, made by Dell Star Technologies, Inc. If standard coaxial cable is chosen as transmission medium 7, a simple analog video cable driver and receiver (such as a Maxim Integrated Products Inc., part number MAX408) may be used. If imaging sensors 10 have digital outputs, either inherently or by the use of a separate analog-to-digital converter, video transmitter 13 and video receiver 14 may consist of conventional digital modems or conventional Local Area Network (LAN) circuits.

Bandwidth reduction is achieved for the transmission from transmitter 13 to receiver 14 because the transmitter 13 transmits only one image frame at a time and transmits it at the rate at which it is produced. Image processor 15 receives video frames from video receiver 14 one at a time, decodes the sensor number from each video frame it receives and stitches together the frames to form the mosaic according to well-known mosaicing processes such as that taught by Peter J. Burt et al in U.S. Pat. No. 5,649,032. Because all of the classical elements of currently known mosaicing techniques are utilized in the Remote Mosaic System, the invention retains the inherent capability of such techniques to eliminate image instability due to image system platform motion. It further retains the ability to produce a mosaic that effectively results in a compressed digital image. This compressed digital image is rapidly scrollable to any point and any sub-image may be readily extracted from it for transmission to another remote observer.

The output of image processor 15 is input to workstation 16 (a high-performance Windows-based Personal Computer or Unix-based workstation) which contains a high-capacity disk drive. Workstation 16 serves as a temporary storage facility for image processor 15 as the processor builds the mosaic as well as providing the mosaic (both as it is being constructed and post-construction) to display unit 17 which usually is the workstation's normal console display. Both during and post-construction, the operator can scroll and zoom the mosaic to view the portions he needs at the resolution he wants. Further, since the mosaic is already a digital image in the memory of workstation 16, any portion of the mosaic image can be selected by the operator and sent digitally to other observers.

Figure 4:
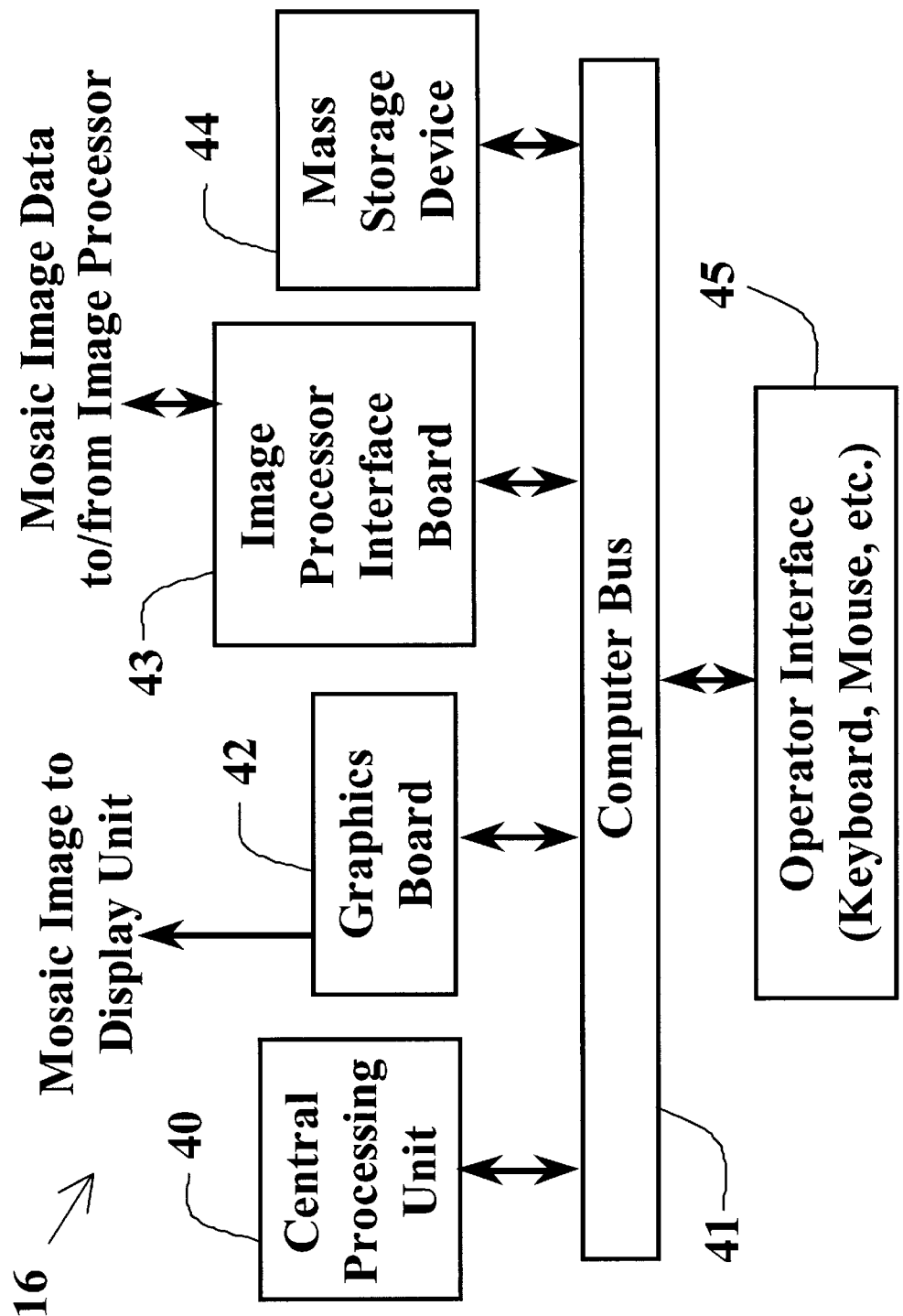
FIG. 4 shows the details of workstation 16.

FIG. 4 shows the details of workstation 16. Central Processing Unit 40, when loaded with conventional software, controls the operation of all elements of workstation 16 through computer bus 41. Graphics board 42 receives mosaic image data from mass storage device 44, buffers the image in its on-board memory and generates the signals required to drive display unit 17. Because graphics board 42 contains its own memory, it can cause the mosaic to scroll rapidly through the mosaic image as commanded by the operator through operator interface 45 and central processing unit 40. Additionally, graphics board 42 can be used to zoom and de-zoom the mosaic image, as the operator requires. Image processor interface board 43 receives mosaic images from image processor 15 and sends them to the mass storage device 44. In some versions of the invention, it may also be desirable to send portions of a mosaic image from mass storage device 44 to image processor 15. This may be necessary when processing large mosaic images containing many image strips. Combining a large number of image strips together into a large mosaic often requires a correspondingly large amount of temporary image storage which can be provided economically by mass storage device 44. In such cases, image processor interface board 43 may transfer these temporary images from mass storage device 44 to image processor 15. Operator interface 45 may contain a conventional keyboard, mouse, trackball, etc. as required for the operator to interact with workstation 16. Lastly, display unit 17 may be any conventional video display such as those made by Sony Corporation, ViewSonic Corporation, and others. Because the mosaic image is rapidly scrollable, the resolution of the display need not match the resolution of the mosaic. This allows the use of low cost displays or displays that must be physically small due to weight or size constraints.

Although a particular embodiment and form of this invention has been illustrated, it is apparent that various modifications and embodiments of the invention may be made by those skilled in the art without departing from the scope and spirit of the foregoing disclosure. Accordingly, the scope of the invention should be limited only by the claims appended hereto.

We claim:

1. A remote mosaic imaging system having high-resolution, wide field-of-view and low bandwidth ("Remote Mosaic System"), said Remote Mosaic System comprising: a plurality of scannable imaging sensors for producing a plurality of input images of a pre-selected target area, each of said input images depicting a different segment of said target area; an image processor for receiving said plural input images and stitching said images together to produce a single flat field-of-view mosaic image of the entirety of said target area, said flat view image being displayable on a display unit; a means for transmitting said plurality of input images to said image processor; and a means for reducing the bandwidth of image transmission, said bandwidth-reducing means being coupled between said imaging sensors and said transmitting means, said bandwidth-reducing means comprising a multiplexer for receiving said plurality of input images from said sensors and forwarding said images to said transmitting means, and a timing generator coupled concurrently to said multiplexer and said imaging sensors, said timing generator containing therein a means for generating synchronization signals to synchronize the production of input images by said imaging sensors and direct said multiplexer to forward only one input image at a time selectively to said transmitting means, said transmitting means transmitting in real-time said time-division multiplexed input image to said image processor.

2. A Remote Mosaic System as set forth in claim 1, wherein said means for generating synchronization signals comprises an oscillator for producing pulses to define the start of an image segment by one of said imaging sensors; a synchronization signal counter coupled to receive said pulses from said oscillator and, in response thereto, output an indicating signal representative of a particular image segment from a particular sensor; a decoder for receiving said indicating signal from said synchronization signal counter and, in response thereto, output timing signals, said timing signals being input to said imaging sensors to synchronize their production of input images of the pre-selected target area.

* * * * *